United States Patent [19]

Malev et al.

[11] 4,194,945

[45] Mar. 25, 1980

[54] FILTERING MATERIAL AND PROCESS FOR PRODUCING SAME

[76] Inventors: Oleg A. Malev, Institutsky prospekt, 9, kv. 55; Idel N. Khalandovsky, Vitebsky prospekt, 53, korpus 3, kv. 106; Moisei R. Kagan, ulitsa Kostjushko, 58, kv. 44; Evageny Y. Pechko, Krasnoe Selo, Fabrichny Poselok, 4, kv. 7; Lev N. Laptev, Institutsky prospekt, 9, kv. 30, all of Leningrad; Semen S. Vaikhansky, Narodnava ulitsa, 4, Tsjurupinsk Khersonskoi oblasti; Anatoly I. Khorunzhy, Industrialnaya ulitsa, 2, Livny Orlovskoi oblasti; Valery K. Afanasiev, Borodinskaya ulitsa, 1/88, kv. 13, Leningrad, all of U.S.S.R.

[21] Appl. No.: 864,436

[22] Filed: Dec. 27, 1977

[51] Int. Cl.$^2$ .............................................. D21F 11/14
[52] U.S. Cl. .................... 162/135; 162/146; 162/149; 210/508; 55/524; 55/528
[58] Field of Search ............... 162/13, 23, 78, 146, 162/145, 149, 148, 165, 166, 167, 135; 210/508, 510, 505; 55/524, 528

[56] References Cited

U.S. PATENT DOCUMENTS 3,573,158   3/1971   Pall et al. ............................. 162/145

FOREIGN PATENT DOCUMENTS 2535970   2/1976   Fed. Rep. of Germany ............. 162/23

*Primary Examiner*—S. Leon Bashore
*Assistant Examiner*—William F. Smith
*Attorney, Agent, or Firm*—Steinberg & Blake

[57] ABSTRACT

The invention relates to a filtering material and a process for producing same. The proposed material can most advantageously be used in filter elements of internal-combustion engines, ventilation and air-conditioning systems, dust- and gas-collecting apparatus, and systems of purifying petroleum products of various viscosities and degrees of contamination, as well as for filtration of liquid foodstuffs, chemicals, and domestic sanitary and hygienic products. The filtering material contains 60 to 85% by volume of pores 5 to 40 microns in size, varying in diameter by no more than 5 microns. According to the proposed process, preshredded cellulose-containing material is refined in an air medium, at a concentration of at least 80% BD, to an average fiber length of 0.3 to 2.5 mm with subsequent dispersion of said fiber in an aqueous medium to obtain a uniform fibrous suspension with a concentration of 1.5 to 6% and make-up of the furnish from the suspension and additives.

2 Claims, No Drawings

FILTERING MATERIAL AND PROCESS FOR PRODUCING SAME

The present invention relates to a filtering material and a process for producing same.

The invention can most advantageously be used as filter elements in internal-combustion engines, ventilation and air-conditoning systems, dust- and gas-collecting apparatus, and systems of purifying petroleum products of various viscosities and degrees of contamination. In addition, the invention is applicable in filtering liquid foodstuffs, chemicals, domestic sanitary and hygienic products, i.e., when used as filter elements meeting most stringent requirements as to both their retentivity and permeability.

The currently produced filtering materials for filtering gases with various concentration of suspended matter and liquids of various viscosity have pores 0.1 to 120 microns in diameter, their structure being such that individual pores differ widely in diameter. This results in nonuniformity of the filtering material and its poor performance as far as its retentivity and permeability are concerned.

Known in the art are processes for producing filtering materials, which are based on varying the length and structure of the cellulose-containing fibers, making up a furnish by way of addition of both natural and man-made fibers as well as water-repellent agents.

According to a prior art process for producing a filtering material in the form of paper, the ratio of long to short fibers is varied by refining two portions of a cellulose-containing stock in two parallel flows in an aqueous medium, followed by a furnish being made up thereof. One portion is refined at a low concentration (0.5 to 10% BD), while the other portion is refined at a high concentration (15 to 40% BD). However, since the processes of fibrillation and cutting, during refining in an aqueous medium, are always conducted simultaneously and independently of the concentration of the stock being refined, it is practically impossible to control, in a broad range, the physicomechanical, capillary-porous and structural-sorptive characteristics of the filtering material.

This is due to the fact that refining in an aqueous medium is inevitably accompanied by appreciable swelling, fibrillation and cutting of fibers, which, in the course of production of the filtering material; leads to stronger fiber-to-fiber bonds, consequently, to a drastic deterioration of its filtering capacity or performance depending on the capillary-porous and structural-sorptive characteristics thereof. In this case, it is impossible to meet the requirements as to the above characteristics.

Processes are known that permit broadening the range in which the physicomechanical, capillary-porous and structural-sorptive properties of filtering materials are controlled, by varying the specific pressure in the refining zone, the concentration of the stock being refined, the specific load on the knife edge, the pH of the medium, the type of refining knives pattern, etc.

According to these processes, a cellulose-containing stock is refined in an aqueous medium by means of beaters or other batch or continuous refining units, at a stock concentration of 1.5 to 4.0%, to an average fiber length of 1.5 to 2.0 mm, whereafter a furnish is made up by way of addition of natural and/or man-made fibers as well as water-repellent agents to yield a uniform fibrous suspension. Then, a sheet is formed, pressed and dried to condition. To provide for the required properties of the filtering material, a sizable amount of natural and/or man-made fibers (up to 70% of the total filtering material weight) must be introduced into the furnish.

The reason for this resides in two processes occurring simultaneously and independently of each other during refining in an aqueous medium:

fibrillation leads to intensive fiber-to-fiber bonds, higher mechanical strength of the filtering material, but, at the same time, to a more closed surface, lower porosity, permeability, sorbability, bulk, absorbability, etc.;

cutting improves the capillary absorbability of the filtering material, its air permeability, porosity and sorbability, but, on the other hand, it results in lower mechanical strength of the material, poorer elasticity and higher plasticity thereof.

Thus, the most serious disadvantage of the prior art processes of producing filtering materials, based on refining cellulose-containing stock in an aqueous medium, is the impossibility of distinctly separating the processes of fibrillation and cutting of fibers, which rules out the possibility of selectively controlling such physicomechanical characteristics of the filtering material as porosity, air permeability, sorbability, bulk, mechanical strength, elasticity and plasticity.

In addition, the prior art processes necessitate a substantial amount of expensive man-made fibers.

The principal object of the invention is to provide a filtering material and a process which will yield a material having a structure with pores substantially similar in size and ensure the required capillary-porous and structural-sorptive properties with a possibility of controlling them within a wide range.

This object is attained by that a filtering material based on cellulose-containing raw material and having pores 0.1 to 120 microns in size, according to the invention, contains 60 to 85% by volume of pores 5 to 40 microns in size, the pores varying in diameter by no more than 5 microns.

In a process for producing a filtering material by way of preliminary shredding of the cellulose-containing material, refining it, subsequent addition thereto of natural or man-made fibers as well as water-repellent agents, with a furnish being made up in an aqueous medium to obtain a uniform fibrous suspension which is then formed into a sheet, pressed and dried to condition, according to the invention, the preshredded stock is refined in an air medium to a concentration of at least 80% BD and to an average cellulose fiber length of 0.3 to 2.5 mm with subsequent dispersion of the fiber in an aqueous medium to obtain a uniform fibrous suspension with a 1.5 to 6% concentration and make-up of the furnish from said suspension and additives.

As a result of refining of the cellulose-containing stock in an air medium, fibrillation is precluded, which minimizes subsequent swelling of fibers and ability to form fiber-to-fiber bonds, as well as permits obtaining a highly porous filtering material with minimum consumption of man-made fibers.

More uniform cutting of fibers, as compared to refining in an aqueous medium, ensures structural uniformity of the filtering material.

In the process according to the invention, the furnish made up of a mixture of cellulose fibers and additives, refined in an air medium, should preferably be impregnated, after forming, pressing and drying, with a resin solution to a 15 to 90% degree of polycondensation. The impregnation of the filtering material with resin solutions improves its water-repellent, thermal resistance and mechanical strength characteristics. It is also preferable, in the process according to the invention, to refine, in an air medium, part of the preshredded cellulose-containing stock, the rest being refined in an aqueous medium to a concentration of 1.5 to 40.0% BD and to 15° to 60° SR. This permits controlling the ratio of fibrillated and nonfibrillated fibers of the cellulose-containing stock in the furnish of the filtering material, thereby varying widely its capillary-porous and structural-sorptive characteristics.

It is advisable that, according to the invention, the furnish made up of the mixture of fibers refined in an air and aqueous media with additives be formed into a sheet, pressed, dried and impregnated with a resin solution to a 15 to 90% degree of polycondensation. This substantially improves the water-repellent, thermal resistance and mechanical strength characteristics of the filtering material.

The present invention is embodied as follows:

A starting preshredded cellulose-containing material is refined in an air medium at a concentration of at least 80% BD, in a continuous-action apparatus, to an average fiber length of 0.3 to 2.5 mm. Then, the dry fibers cut to the above length are dispersed in an aqueous medium to obtain a uniform fibrous suspension with a 1.5 to 6% concentration, with the required vibrous and water-repellent additives being introduced thereinto. The resulting suspension is diluted, if necessary, to a concentration of 0.1 to 2.5% and delivered to a machine chest.

The forming, pressing and drying of the filtering material are performed on conventional board (paper) machines by conventional techniques. According to the invention, there is also a possibility of controlling, within a broad range, the capillary-porous and structural-sorptive properties of the filtering material by refining only a portion of the preshredded cellulose-containing material in an air medium with subsequent dispersion in an aqueous medium to obtain a uniform fibrous suspension with a concentration of 1.5 to 6%. The remaining portion dissolved in advance is refined at a concentration of 1.5 to 40.0% BD to 15° to 60° SR. Then, both portions of the refined cellulose-containing stock are blended and, if necessary, fibrous and water-repellent additives are introduced.

The required capillary-porous and structural-sorptive characteristics of the filtering material are controlled, according to the invention, by varying the degree of treating of said portions of the cellulose-containing stock and their ratio, while making up the furnish.

Should it become necessary to further improve the water-repellent, thermal resistance and mechanical strength characteristics of the filtering material, it is impregnated with resin solutions to a polycondensation degree of 15 to 90%.

The invention will be better understood from the following examples illustrating preferred embodiments thereof.

EXAMPLE 1

Filter board for filter elements of air filters and crankcase ventilation in automobile carburetor engines is prepared from the following furnish:

| | |
|---|---|
| cotton cellulose | 83% |
| man-made fiber | 15% |

-continued

| | |
|---|---|
| synthetic binding fiber | 2% |

The starting cotton cellulose with a dryness of 88% is, according to the invention, shredded into individual pieces 20×20 mm in size and delivered by means of a feeder to a continuous refining unit. Refining is conducted at the abovementioned dryness and at a particular concentration of the air suspension of the fiber in the refining zone. The fiber is refined to an average length of 0.3 to 0.4 mm. Then, the refined cotton cellulose is fed into a chest where it is dispersed in an aqueous medium to a fibrous suspension at a concentration of 2.5 to 2.8%.

The degree of refining the cellulose in the chest is 9.5° to 10° SR.

From the chest, the cellulose is delivered to a beater, hydropulper or any other units adapted to provide for additional dispersion. The dispersion time is 5 to 7 minutes, whereafter metered amounts of the binder fiber and man-made fiber are consecutively introduced into the beater or whatever unit is used. The final degree of refining the furnish is 11° to 12° SR.

Then, the stock is delivered through a system of chests additional refining and cleaning to a fourdrinier board machine where a sheet of the base filter board is formed and dried.

The base filter board is impregnated with an aldehyde resin solution to a polycondensation degree of 15% to ensure high mechanical strength, water-repellent and elastic-relaxation characteristics of the finished board to enable subsequent quality corrugation of the board and making filter elements therefrom.

The characteristics of the resulting filter board are compared with those of board prepared by a prior art process in Table 1, the furnish of the latter board including 50% of cotton cellulose, 48% of man-made fiber, and 2% of synthetic binding fiber.

Table 1

| Ref. | | Filter board | |
|---|---|---|---|
| No. | Characteristics | prior art | proposed |
| 1 | Mass, g/sq.m | 145 | 146 |
| 2 | Density, g/cu.cm | 0.28 | 0.20 |
| 3 | Resistance to a constant air flow, mm H2O | 0.25 | 0.18 |
| 4 | Total range of pore sizes, μ | 0.51 to 120.0 | 3.01 to 120.0 |
| 5 | Total pore volume, cu.cm/g | 2.25 | 3.25 |
| 6 | Volume of pores 35 to 40 microns in size, cu.cm/g | 0.5 | 1.95 |
| 7 | Volume of pores 35 to 40 microns in size, % of the total volume | 22.0 | 60.0 |
| 8 | Volume of pores of other sizes, % | 78.0 | 40.0 |
| 9 | Permeability to coarse dust according to SAE, % | 98.2 | 99.6 |
| 10 | Retentivity with respect to coarse dust according to SAE, % | 43.0 | 62.5 |
| 11 | Filtering effectiveness, μ | 5.5 | 4.0 |

As can be seen from the tabulated data, the proposed process ensures a relatively monodisperse porous board structure with a predominant pore size of 35 to 40 microns, such pores constituting 60% of the total pore volume. Thus, the board produced by the proposed process provides for better permeability and retentivity, as compared to that produced by the prior art process, as well as lower aerodynamic resistance and smaller size of the particles passing through the filter.

The above advantages have been attained with a much lower content of expensive man-made fiber in the furnish.

EXAMPLE 2

Filter board for air cleaners in diesel engines is produced, according to the invention, from a furnish containing:

| | |
|---|---|
| cotton cellulose | 40% |
| sulfate softwood cellulose | 60%. |

According to the invention, the cotton cellulose is refined in an aqueous medium at a concentration of 3.0 to 3.5 to a 15° to 16° SR. Sulfate softwood cellulose is refined at a dryness of 94% by the technique described in Example 1 to an average fiber length of 2.0 to 2.2 mm.

The furnish is made up in a furnish chest where a concentration of 2.5 to 3.0% is maintained. Also introduced into the furnish chest are resin size, alums and a solution of melamine formaldehyde resin. The processes of forming, pressing and drying are carried out using conventional techniques.

The characteristics of the proposed board and board produced by a prior art process are given in Table 2, the furnish of the latter board including 100% of cotton cellulose refined in an aqueous medium.

Table 2

| Ref. No. | Characteristics | Filter board | |
|---|---|---|---|
| | | prior art | proposed |
| 1 | Mass, g/sq.m | 115.0 | 117.0 |
| 2 | Density, g/cu.cm | 0.32 | 0.24 |
| 3 | Resistance to a constant air flow, mm H₂O | 0.8 | 0.5 |
| 4 | Total range of pore sizes, μ | 0.5 to 110 | 1.0 to 85.0 |
| 5 | Total pore volume, cu.cm/g | 2.27 | 2.62 |
| 6 | Volume of pores 25 to 30 microns in size, cu.cm/g | 0.93 | 1.9 |
| 7 | Volume of pores 25 to 30 microns in size, % of the total volume | 41.0 | 72.0 |
| 8 | Permeability to dust with a specific surface of 5,600 cu.cm/g, % | 98.0 | 99.9 |
| 9 | Retentivity with respect to dust with a specific surface of 5,600 cu.cm/g, g/sq.m | 300 | 440 |
| 10 | Filtering effectiveness, μ | 4.5 | 2.0 |

Thus, the proposed board features a more uniform structure ensuring a much lower aerodynamic resistance, high permeability and retentivity, as well as permits retaining smaller abrasive particles. Note also that the proposed board is made of cheaper raw materials.

EXAMPLE 3

Filter board for cleaning gas exhausts polluting the environment is produced, according to the invention, from a furnish containing:

| | |
|---|---|
| unbleached sulfate softwood cellulose | 80% |
| Inorganic fiber | 15% |
| synthetic binding fiber | 5% |

According to the invention, the unbleached sulfate cellulose with 80% dryness is shredded and fed into a continuous refining unit.

The pulp is refined to an average fiber length of 1.6 to 1.8 mm. After dispersion, the softwood cellulose is blended with a prepared mixture of the inorganic and synthetic binding fibers, then sized as described in Example 2.

The forming, pressing and drying are performed by known techniques. The characteristics of filter boards produced by the proposed and prior art methods are listed in Table 3, with refined wood cellulose being used in the latter case instead of unbleached one, taken in the same amount and refined in an aqueous medium.

Table 3

| Ref. No. | Characteristics | Filter board | |
|---|---|---|---|
| | | prior art | proposed |
| 1 | Mass, g/sq.m | 105 | 105 |
| 2 | Density, g/cu.cm | 0.36 | 0.30 |
| 3 | Total range of pore sizes, μ | 0.1 to 60 | 0.1 to 40 |
| 4 | Total pore volume, cu.cm/g | 1.08 | 1.82 |
| 5 | Volume of pores 5 to 10 microns in size, cu.cm/g | 0.52 | 1.48 |
| 6 | Volume of pores 5 to 10 microns in size, % of the total volume | 48.0 | 81.0 |
| 7 | Permeability to contaminated gas, % | 89.0 | 99.9 |
| 8 | Filtering effectiveness, μ | 1.5 | 0.4 |

As can be seen from Table 3, the proposed board features a highly uniform structure with a predominant pore size ranging from 5 to 10 microns.

The resulting structure ensures substantially higher permeability and lower absolute filtering effectiveness.

It should also be noted that the above characteristics have been attained using cheaper raw materials.

EXAMPLE 4

Filter board for coarse cleaning of oil distillation products from mechanical impurities is prepared, according to the invention, from a furnish comprising:

| | |
|---|---|
| unbleached sulfate softwood cellulose | 100% |

In accordance with the invention, unbleached sulfate cellulose taken in an amount of 90% of the total quantity (BD) is refined in a continuous-action apparatus, at a 94% dryness, to an average fiber length of 2.1 to 2.3 mm. The rest (10%) is refined in an aqueous medium at a concentration of 15%, at the first stage, and 3.5%, at the second and third stages, to 40° SR. The mixture of fibers refined in an aqueous and air media is sized as in Example 2. The forming, pressing and drying are carried out by appropriate techniques.

The characteristics of filter boards produced by the proposed and prior art processes are given in Table 4, with 100% of refined sulfate cellulose which is treated in an aqueous medium being used in the latter case.

Table 4

| Ref. No. | Characteristics | Filter board | |
|---|---|---|---|
| | | prior art | proposed |
| 1 | Mass, g/sq.m | 240 | 245 |
| 2 | Density, g/cu.cm | 0.38 | 0.32 |
| 3 | Total range of pore sizes, μ | 0.1 to 82.0 | 0.5 to 65.0 |
| 4 | Total pore volume, cu.cm/g | 1.91 | 2.24 |
| 5 | Volume of pores 15 to 20 mic- | | |

Table 4-continued

| Ref. No. | Characteristics | Filter board prior art | proposed |
|---|---|---|---|
|   | rons in size, cu.cm/g | 0.71 | 1.68 |
| 6 | Volume of pores 15 to 20 microns in size, % of the total volume | 37.0 | 75.0 |
| 7 | Filtering efficiency, l/min.sq.m | 880.0 | 1,100.0 |

As can be inferred from Table 4, the board produced by the proposed process contains 75% of pores 15 to 20 microns in size with the result that it features improved uniformity and higher permeability. The raw materials used in this case are much cheaper.

EXAMPLE 5

Sanitary tissue paper is produced, according to the invention, from a furnish containing:

| bleached sulfate cellulose | 100% |
|---|---|

According to the proposed process, bleached sulfate cellulose taken in an amount of 75% of the total (BD) is shredded with subsequent refining, at an initial dryness of 86%, to an average fiber length of 1.2 to 1.5 mm. The remaining portion of the cellulose (25%) dissolved in advance is refined in an aqueous medium at a concentration of 2.5 to 3.0% to 22° to 25° SR. The furnish is made up, formed, pressed and dried as in the previous examples.

The characteristics of the paper produced by the proposed process and those of paper produced by a prior art process are summarized in Table 5, in the latter case they use bleached sulfite cellulose taken in the same amount and refined in an aqueous medium.

Table 5

| Ref. No. | Characteristics | Paper prior art | proposed |
|---|---|---|---|
| 1 | Mass, g/sq.m | 42.0 | 41.0 |
| 2 | Density, g/cu.cm | 0.28 | 0.22 |
| 3 | Total range of pore sizes, $\mu$ | 0.5 to 70 | 2 to 50 |
| 4 | Total pore volume, cu.cm/g | 0.85 | 1.48 |
| 5 | Volume of pores 30 to 35 microns in size, cu.cm/g | 0.34 | 1.26 |
| 6 | Volume of pores 30 to 35 microns in size, % of the total volume | 40.0 | 85.0 |
| 7 | Water absorbancy, % | 89.0 | 147.0 |
| 8 | Modulus of elasticity kg/sq.mm | 230.0 | 89.0 |

Table 5 shows that the paper produced by the proposed process has a predominant pore size of 30 to 35 microns, these pores constituting 85% of the total pore volume; the paper features higher absorbability, softness and a low modulus of elasticity as compared to that produced by the prior process from more expensive raw materials.

EXAMPLE 6

Filter board for filtration of liquid; foodstuffs is produced, according to the invention, from a furnish containing:

| bleached softwood cellulose | 82% |
|---|---|
| chrysolite asbestos | 8% |
| diatomite | 10% |

In accordance with the proposed process, bleached cellulose in an amount of 40% (out of 82% of its content in the furnish) is refined, at a dryness of 84%, to an average fiber length of 0.3 mm. The rest of the cellulose (42%) is refined in an aqueous medium, at a concentration of 3.0 to 3.5%, to 19° to 21° SR. At the same time, a suspension of asbestos and diatomite is prepared. The furnish is made up as in the previous examples. The sizing is done with starch derivatives. The board is formed, pressed and dried in a conventional manner.

The characteristics of filter boards produced by the proposed and prior art processes are given in Table 6, in the latter case use being made of expensive mercerized cellulose refined in an aqueous medium.

Table 6

| Ref. No. | Characteristics | Filter boards prior art | proposed |
|---|---|---|---|
| 1 | Mass, g/sq.m | 1,200 | 1,200 |
| 2 | Density, g/cu.cm | 0.55 | 0.44 |
| 3 | Total range of pore sizes, $\mu$ | 0.1 to 40 | 0.1 to 28 |
| 4 | Total pore volume, cu.cm/g | 2.07 | 2.75 |
| 5 | Volume of pores 5 to 10 microns in size, cu.cm/g | 0.7 | 1.79 |
| 6 | Volume of pores 5 to 10 microns in size, % of the total volume | 35 | 65 |
| 7 | Filtering efficiency, l/min.sq.m | 655 | 900 |
| 8 | Sorption capacity, g/sq.m | 380 | 550 |

As can be seen from Table 6, the board produced by the proposed process is highly uniform and features a monodisperse porous structure with predominant (65% by volume) pore sizes ranging from 5 to 10 microns. The porous structure offers such advantages as high filtering efficiency and sorption capacity which is almost 1.5 times higher than that of the board produced by the prior art process from more expensive raw materials.

EXAMPLE 7

Filter board for filtration of chemical solutions and cleaning them from chemical and mechanical impurities is produced, according to the invention, from a furnish containing:

| hydrated cellulose fiber | 95% |
|---|---|
| synthetic binding fiber | 5% |

In accordance with the invention, the hydrated cellulose fiber is refined, at a dryness of 96%, at an optimum concentration thereof in an air suspension to an average fiber length of 1.9 to 2.0 mm. The furnish is made up, formed, pressed and dried in a conventional manner.

The characteristics of filter boards produced by the proposed and prior art processes, impregnated with a chemically stable compound to a polycondensation degree of 90%, are listed in Table 7, the furnish of the board produced by the prior art process being refined in an aqueous medium.

Table 7

| Ref. No. | Characteristics | Filter board prior art | Filter board proposed |
|---|---|---|---|
| 1 | Mass, g/sq.m | 300 | 300 |
| 2 | Density, g/cu.cm | 0.45 | 0.32 |
| 3 | Total range of pore sizes, μ | 0.1 to 90 | 1.0 to 75 |
| 4 | Total pore volume, cu.cm/g | 1.85 | 2.52 |
| 5 | Volume of pores 35 to 40 microns in size, cu.cm/g | 0.22 | 1.46 |
| 6 | Volume of pores 35 to 40 microns in size, % of the total volume | 12 | 60 |
| 7 | Filtering efficiency, l/min.sq.m | 244 | 420 |
| 8 | Filtering effectiveness, | 10 | 6 |

Table 7 indicates that the board produced by the proposed process features a cumulative distribution of pores in the range of sizes from 35 to 40 microns, which ensured improved filtration rating and efficiency as compared to the board produced by the prior art method.

What is claimed is:

1. A process for producing a porous filtering material formed of fibrous stock at least a portion of which comprises cellulose-based fibrous stock, comprising the steps of: preliminarily shredding the cellulose based fibrous stock; refining a portion of said preshredded cellulose based fibrous stock in an air medium, at a concentration of at least 80% BD, such that the average length of the cellulose-based fibrous stock is in the range of from 0.3 to 2.5 mm; dispersing the refined portion of the cellulose-based fibrous stock in an aqueous medium to obtain a uniform fibrous suspension with a concentration of 1.5 to 6%; refining the remaining portion of the fibrous stock in an aqueous medium at a concentration of 1.5 to 40.0% BD to 15° to 60° SR whereafter both portions are intermixed to form a suspension; introducing additional fiber stock additives and water-repellant agents into the resulting suspension to formulate a furnish from said suspension and said additives and agents; forming a sheet from said furnish; pressing said sheet and drying the same, whereby a filtering material is produced having pores, 60 to 85% by volume of which have diameters which are within 5 microns of each other and are in the range of from 5 to 40 microns.

2. A process as claimed in claim 1 wherein subsequent to drying the sheet formed from the furnish, impregnating the sheet with a resin solution to a polycondensation degree of 15 to 90%.

* * * * *